W. W. SIBSON & T. ALLSOP.
PROCESS AND APPARATUS FOR DRYING AND CONDITIONING MATERIALS.
APPLICATION FILED JULY 28, 1913. RENEWED JUNE 20, 1916.

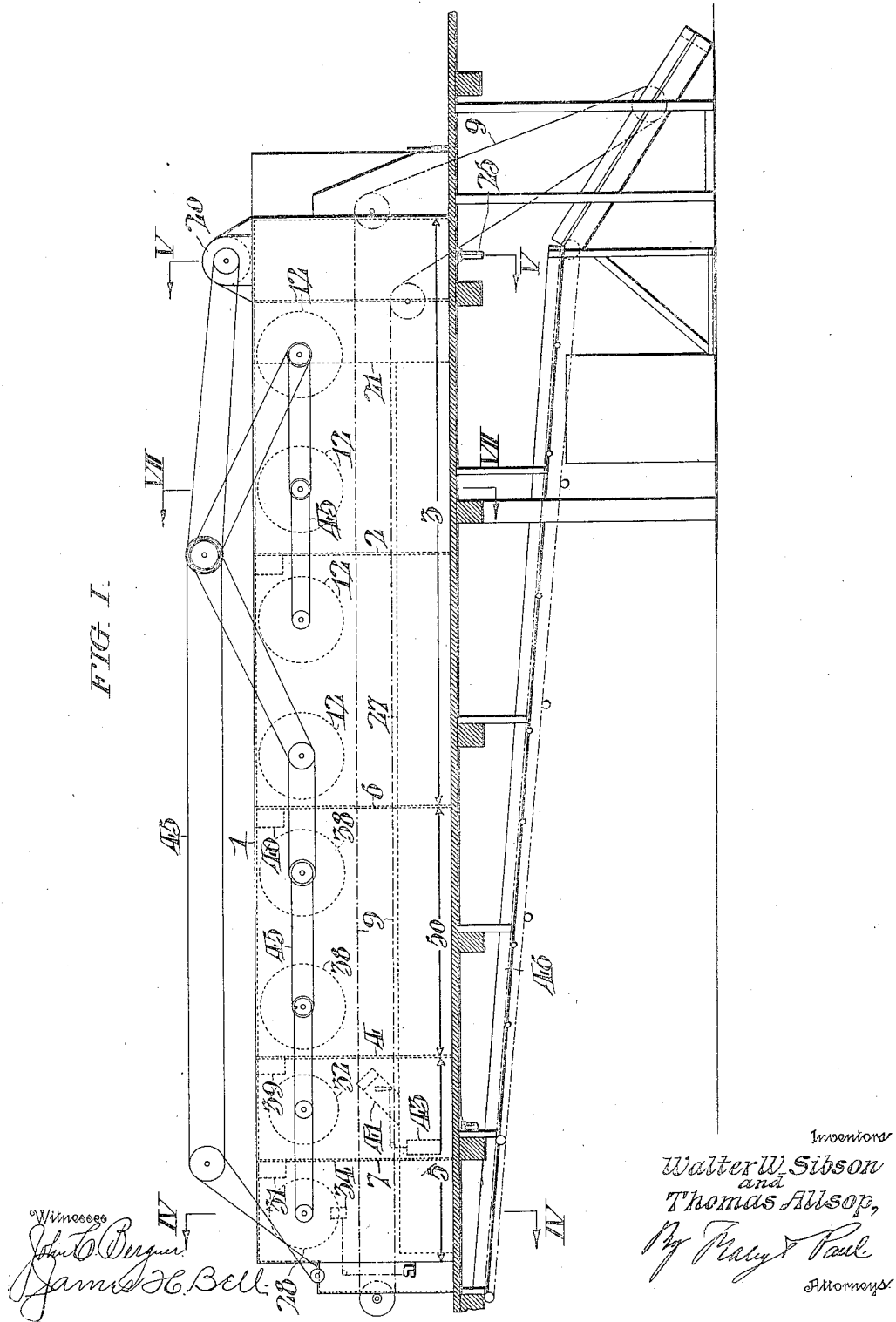

1,213,549.  
Patented Jan. 23, 1917.  
7 SHEETS—SHEET 2.

W. W. SIBSON & T. ALLSOP.
PROCESS AND APPARATUS FOR DRYING AND CONDITIONING MATERIALS.
APPLICATION FILED JULY 28, 1913. RENEWED JUNE 20, 1916.
1,213,549.
Patented Jan. 23, 1917.
7 SHEETS—SHEET 3.
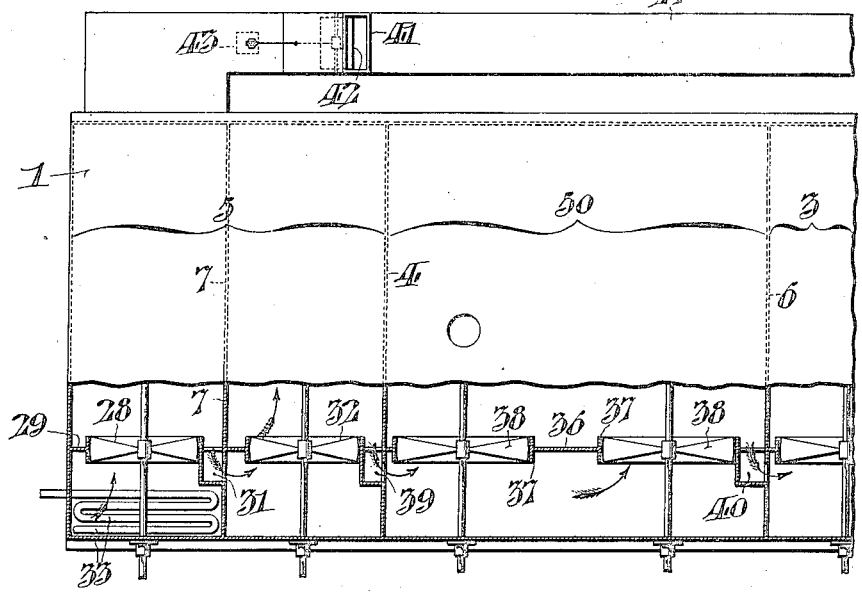
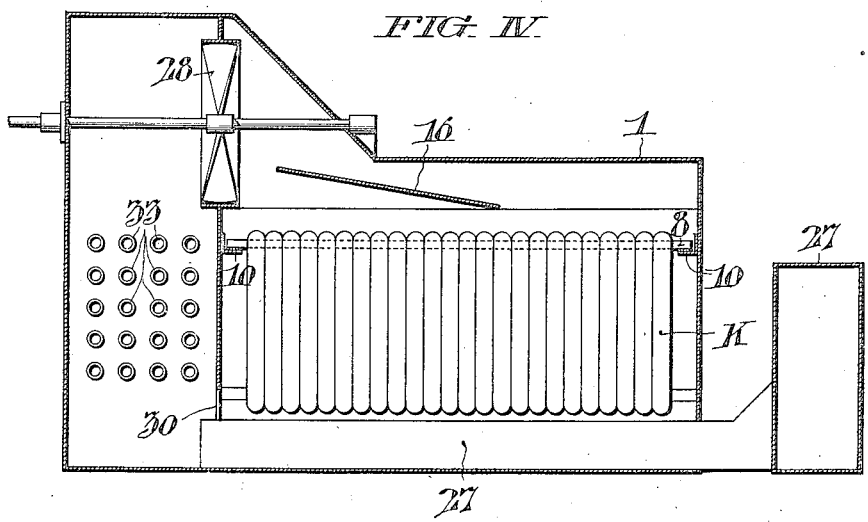
Inventors
Walter W. Sibson
and
Thomas Allsop,

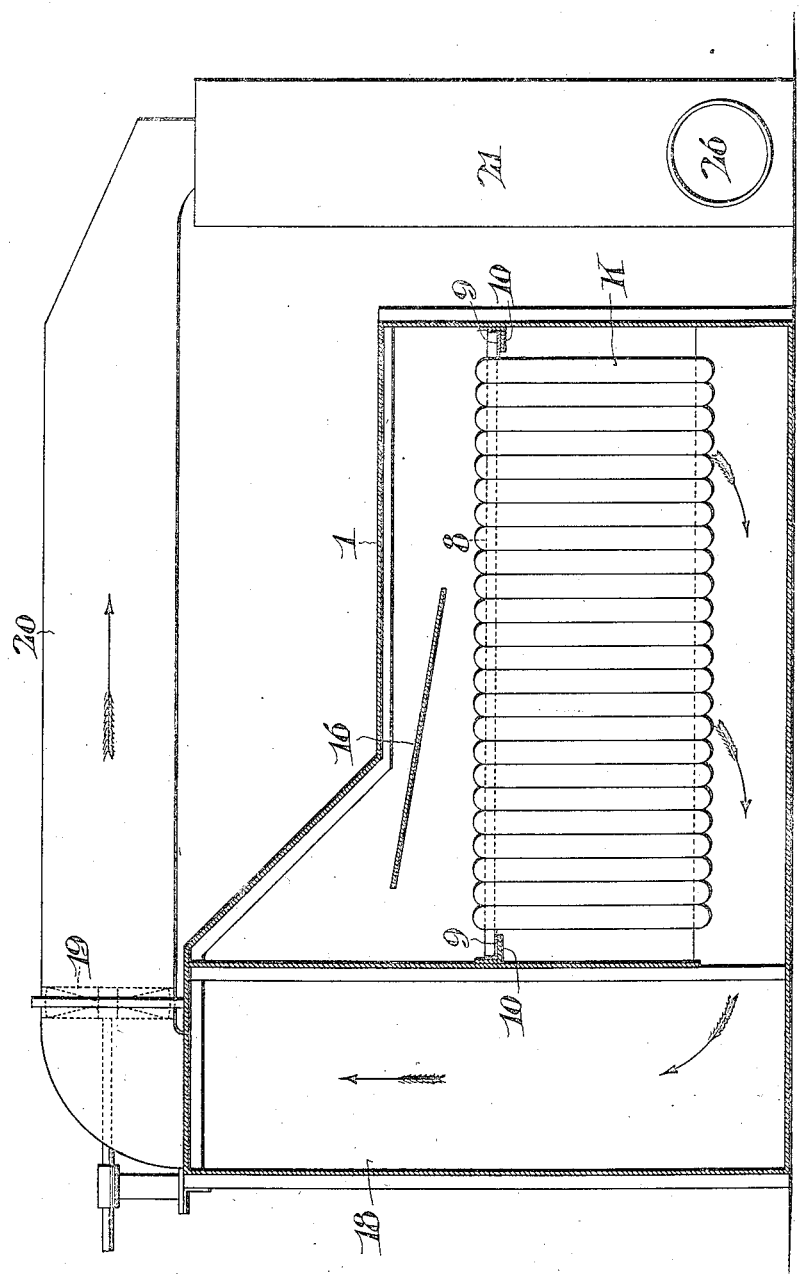

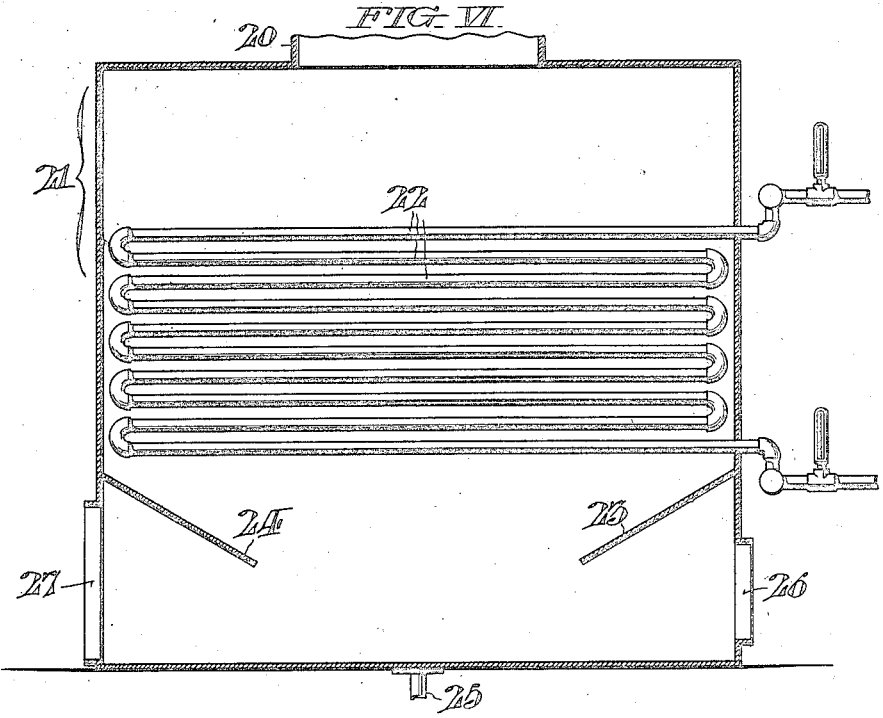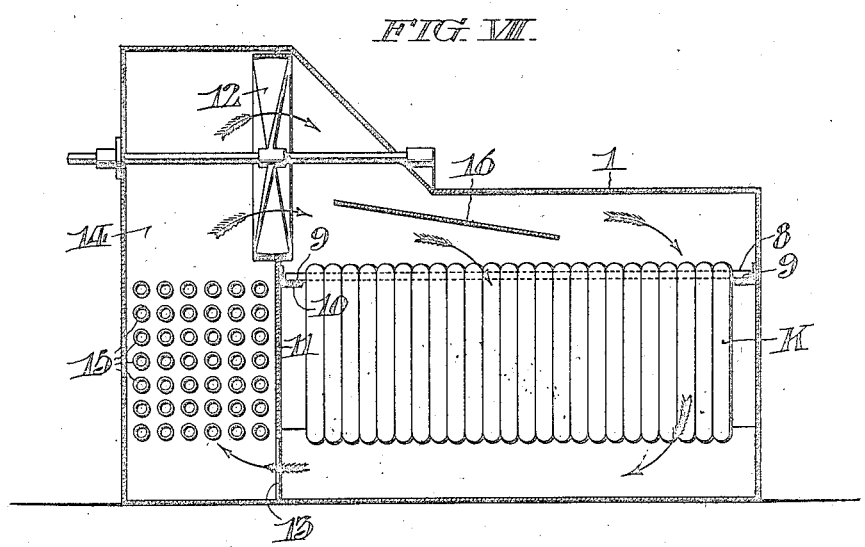

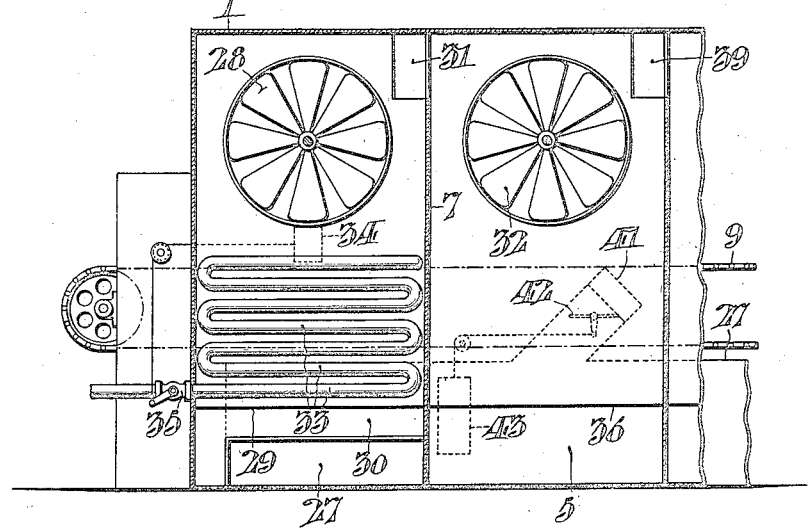
FIG. VIII.
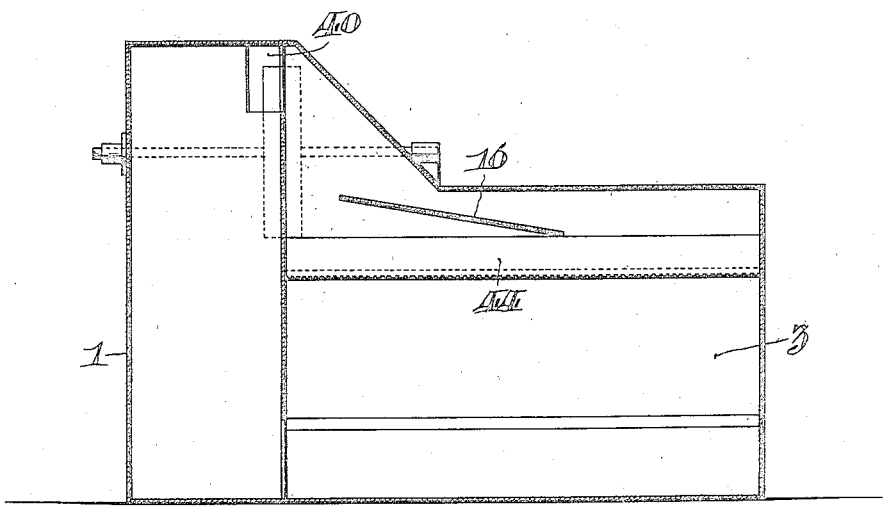
FIG. IX.

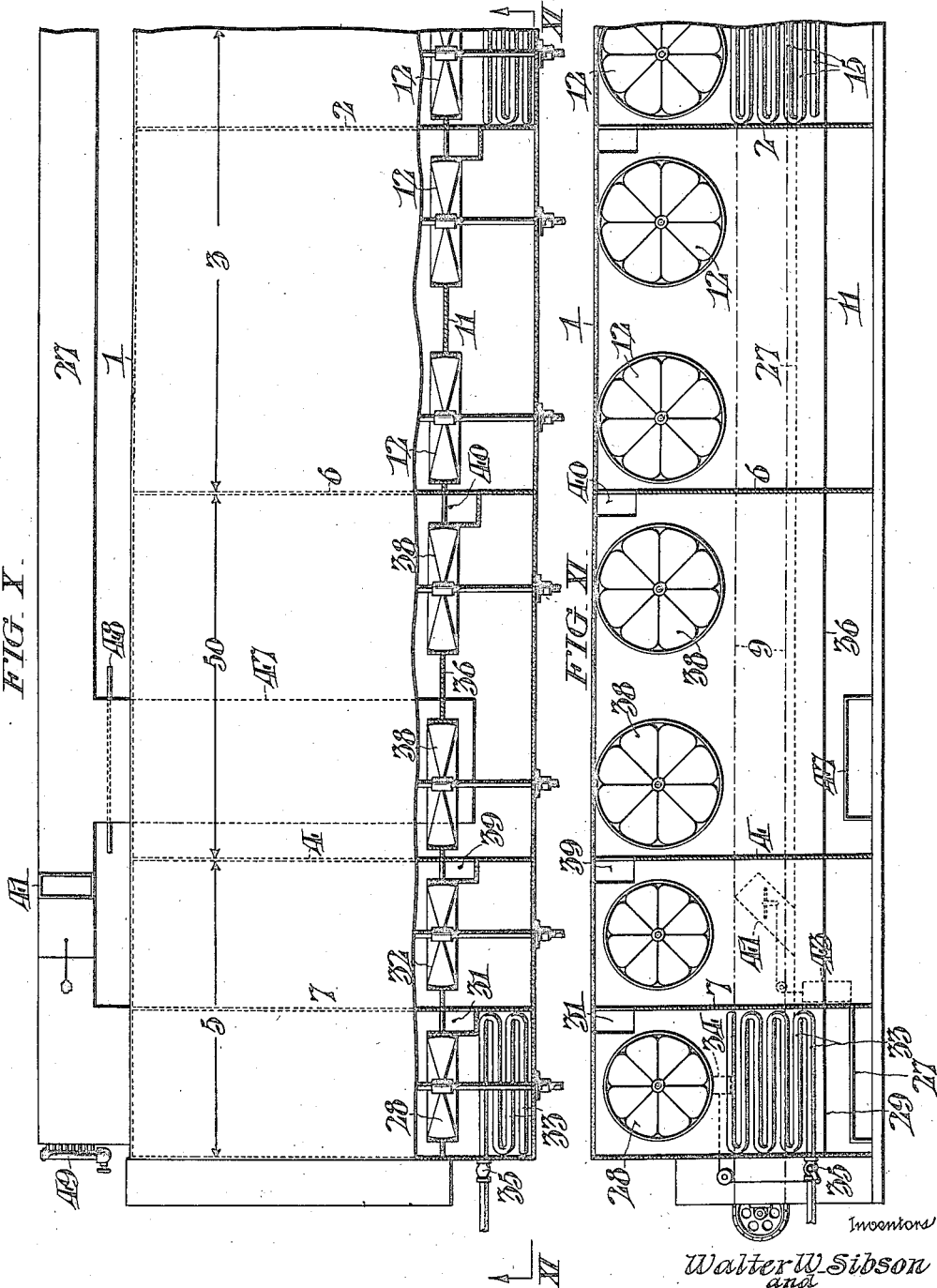

UNITED STATES PATENT OFFICE.

WALTER W. SIBSON AND THOMAS ALLSOP, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA.

PROCESS AND APPARATUS FOR DRYING AND CONDITIONING MATERIALS.

1,213,549.     Specification of Letters Patent.     Patented Jan. 23, 1917.

Application filed July 28, 1913, Serial No. 781,465. Renewed June 20, 1916. Serial No. 104,803.

*To all whom it may concern:*

Be it known that we, WALTER W. SIBSON and THOMAS ALLSOP, of the city and county of Philadelphia and State of Pennsylvania, have invented certain new and useful Improvements in Processes and Apparatus for Drying and Conditioning Materials, whereof the following is a specification, reference being had to the accompanying drawings.

Our invention relates more particularly to a process and apparatus for drying and conditioning yarns or the like, wherein the moisture is driven off or removed from the yarn and a portion of the moisture subsequently restored to the yarn for conditioning the same.

Prior to our invention, systems of drying and conditioning materials have been employed wherein the material is first dried by a current of heated air, after which the material is passed through a compartment open to the atmosphere and a current of cool air circulated about the same, and finally the material is presented to a moistening compartment where it is conditioned.

The more or less sensitive cellular structure of the yarn when subjected to a cooling blast contracts, drawing the fibers close together and resulting in some cases in forming a sort of skin on the exterior of the yarn, which renders the yarn less susceptible to the softening influence of the moist atmosphere to which it is subjected in the conditioning compartment.

An object of our invention is to provide a process of drying and conditioning yarn, wherein the same, after being dried by being subjected to heated air, is subjected to a conditioning atmosphere without being exposed to a cooling blast of air.

An object of our invention is to provide a process of drying and conditioning yarn, wherein the same after being dried is immediately subjected to a tempering atmosphere which maintains the yarn in a soft condition throughout, and from the said tempering atmosphere the yarn immediately passes to the conditioning atmosphere, where the proper amount of moisture is supplied to the yarn.

A further object of our invention is to provide an apparatus consisting of connected compartments, through which the yarn may be passed in succession, which compartments are so constructed that the yarn is first subjected to circulating heated air where it is dried; after which the yarn is immediately subjected to a tempering atmosphere having sufficient heat and moisture therein to prevent undue cooling or drying of the outer fibers; after which said yarn is immediately subjected to a moist atmosphere for conditioning.

A further object of our invention is to provide an apparatus of the above character, wherein the circulating heated air in the drying compartment, which contains considerable moisture, may be passed through a condenser, where a greater portion of the moisture is removed, after which the air is passed to the conditioning compartment and utilized in forming a conditioning atmosphere.

A still further object of our invention is to provide an apparatus of the above character, in which each compartment has a separate circulating means and also a by-pass, whereby a portion of the circulating air may be shunted from one compartment to the next adjacent one from the conditioning compartment toward the drying one.

These and other objects will in part be obvious, and will in part be hereinafter more fully described.

In the drawings, Figure I, is a view in side elevation, showing our improved apparatus. Fig. II, is a top plan view of the same. Fig. III, is an enlarged plan view of one end of the apparatus, certain parts being in horizontal section. Fig. IV, is a sectional view on the line IV—IV, of Fig. I. Fig. V, is a sectional view on the line V—V of Fig. I. Fig. VI, is a sectional view on the line VI—VI of Fig. II. Fig. VII, is a sectional view on the line VII—VII of Fig. I. Fig. VIII, is a longitudinal vertical sectional view through one end of the apparatus. Fig. IX, is a transverse sectional view through the tempering compartment. Fig. X, is a top plan view with certain parts in section, showing a slightly modified form of the apparatus. Fig. XI, is a longitudinal sectional view of the same as indicated at XI—XI, in Fig. X.

Our invention consists generally in providing a process of drying materials, and more especially yarn, wherein the yarn is passed successively through a drying compartment, thence immediately to a tempering compartment, and thence immediately to a conditioning compartment. The drying compartment is heated, and means are provided for causing a circulation of air, so that the heated air will absorb the moisture from the wet yarn, and the yarn is thus dried. This air loaded with moisture, in our preferred form of apparatus, is carried to a condenser, wherein the moisture is for a greater part separated from the air. The air which still contains some moisture, is thence led to a conditioning compartment, wherein the atmosphere is properly conditioned for supplying the yarn with moisture.

Between the conditioning compartment and the drying compartment, the yarn passes through the tempering compartment, as above noted, and in the tempering compartment there is a circulation of air, which may be slightly moist and slightly warm, so as to keep the yarn in soft condition. If the yarn, after leaving the drying compartment, is subjected to a blast of cold air, the outer fibers are contracted, forming a sort of skin on the exterior surface of the yarn, which renders it less susceptible to the moist atmosphere during the conditioning process.

One of the essential features of our process, and also of our improved apparatus, is this tempering compartment, which maintains the yarn in proper condition as it passes from the drying compartment to the conditioning compartment. From certain aspects of the invention, however, the tempering compartment may be made in fact one with the conditioning compartment; that is to say, the conditioning of the yarn may be carried out in several compartments, and these compartments will be connected and also connected to the drying compartment, so that the yarn or material will be passed from the drying compartment to the conditioning compartment without being exposed to any cooling air currents.

Referring more in detail to the drawings, we will describe one form of apparatus for carrying out our improved process, and the process will be made clear from an understanding of the apparatus. Said apparatus consists of an inclosed casing 1, which is divided by partitions into various compartments.

The partition 6 divides the casing so as to form between the partition 6 and the receiving end of the device a drying compartment. A partition 4 extends across the casing and forms with the end of the casing a compartment 5 which is a conditioning compartment. Between the partitions 4 and 6 is a tempering compartment 50.

The drying compartment 3, may be subdivided by a partition 2, and the conditioning compartment 5, may also be subdivided by a partition 7.

Fig. VII, of the drawings shows a cross sectional view through the drying compartment. The skeins of yarn to be dried are indicated in this figure at K. These skeins are supported by rods or poles 8, which are carried through the inclosure by an endless conveyer indicated conventionally in broken lines at 9, Fig. I. These rods 8, rest on angle bars 10, as they pass through the inclosure.

A longitudinal partition 11, divides the heating compartment, so as to provide means whereby the air may be circulated in the compartment. This partition is formed with circular openings in which are located fans 12. The partition is also formed with an opening 13, adjacent the lower end thereof. Air is drawn through the opening 13; thence through the chamber 14, in which are located heating coils 15. The air then passes through the fans 12, over the top of the yarn, and a baffle plate 16, aids in distributing air throughout the heating or drying compartment. The heated air then passes through and about the yarn and again to the opening 13, and is thus caused to circulate through and about the yarn to be dried. This baffle plate 16, distributes the drying medium uniformly throughout the compartment. While we have shown a plate for this purpose, it will be understood that other means may be used for breaking up the force of the air currents, and distributing the same in a uniform manner throughout the material being treated.

The amount of heat supplied to the air may be properly regulated, so that the yarn in passing through the drying compartment will be substantially freed from moisture or water.

The chamber 14, in which the coils are located is separated by a partition 17, so as to form a passageway 18, through which a portion of the moisture-laden air is conveyed by means of a fan 19, to a pipe 20 (see Fig. V), which is connected with a condenser 21, (see Fig. VI). The condenser 21, is provided with coils 22, through which water may be passed for condensing the moisture from the air. Baffle plates 23, and 24, catch the condensation and direct it toward a pipe 25, which may be used for the purpose of drawing off the condensed water. If, however, this condensation contains materials which for reasons of economy might be recovered, the pipe 25, may be connected with any well known apparatus for this purpose.

An opening 26, leads to the atmosphere, and a portion of the air drawn from the drying compartment may be passed out through this opening, if desired. The water passing through the coils 22, becomes heated, and may be used in connection with other devices. After the greater part of the moisture has been separated from the air, the air with the remaining moisture therein passes through the pipe 27, which leads to the conditioning end of the apparatus. Said pipe 27, at the conditioning end of the apparatus extends across and opens into the conditioning compartment at the suction side of the fan 28. The conditioning compartment is also sub-divided by a partition 7, as above noted. A longitudinal partition 29, divides the conditioning compartment, so the air may be caused to circulate therein. This partition has an opening in which is located the fan 28, and also an opening 30, adjacent the bottom of the partition, so that the air is permitted to circulate through the conditioning compartment.

The conditioning chamber at one side of the partition 7, is connected to the conditioning chamber at the other side by a by-pass 31 (see Figs. III and VIII). A portion of the air circulating in the first conditioning chamber will, therefore, be caused to pass through into the conditioning chamber on the other side of the partition 7, and this conditioning chamber is similarly constructed, and a fan 32, causes a circulation therein.

It is sometimes desirable to heat the conditioning compartment, and we have, therefore, provided a heating coil 33, which may be used for supplying the air with sufficient heat to aid in the forming of the proper conditioning atmosphere. It is understood, however, that this heat is not sufficient to dry the yarn to any extent. The temperature of the coils 33, may be controlled by a thermostat 34, located in the conditioning compartment and connected by suitable means to a valve 35, controlling the supply of heating fluid to the coils 33.

The yarn as above noted, in passing from the drying compartment to the conditioning compartment passes through the tempering compartment. This tempering compartment is also divided by a longitudinal partition 36, in which are located openings 37, and fans 38, disposed in the openings 37, cause the air to circulate in and about said tempering compartment. The conditioning compartment is connected with the tempering compartment by a by-pass 39. The tempering compartment 50, communicates with the drying compartment 3, by means of a by-pass 40, which allows a portion of the air circulating at one side of the partition 6, to pass into the drying compartment at the other side of the partition. A by-pass in the partition 2, serves as a communication for shunting a portion of the air between the two compartments of the drying chamber 3. Therefore, it will be apparent that we have provided means whereby the air circulating in the conditioning compartment may be conducted in part to the tempering compartment, and thence to the drying compartment.

The pipe 27, leading from the condenser to the conditioning compartment is provided with an opening 41, which is controlled by a valve 42, and this valve is connected by suitable means to a thermostat 43, which may be so regulated as to supply fresh air to the conditioning compartment, as desired.

While the compartments are separated by cross partitions, these cross partitions are provided with openings which permit the skeins of yarn to pass from one compartment to the other. Swinging curtains 44, may be used in connection with the yarn skeins (see Fig. IX), and these curtains, together with the skeins of yarn, serve as a means for dividing the compartments from each other. It will be understood that other means may, however, be used for separating the compartments one from another, and for permitting the free travel of the yarn through the partitions.

The fans for the different compartments are mounted on suitable shafts extending through the side wall of the inclosure, and these shafts are driven by belts 45, which are connected to suitable driving means. It will be understood that the speed of the belts may be varied as desired, so that the yarn may be caused to travel either slower or faster through the drying and conditioning apparatus.

In Fig. I, of the drawings, we have shown a conveyer 46, which may be used for conveying the rods or poles which support the yarn, back to the front end of the machine after the skeins of yarns have been removed therefrom.

By the above description, it will be apparent that we have provided a drying and conditioning apparatus, wherein the yarn may be presented first to a drying compartment in which the air circulates freely about the yarn, and the circulating air may be heated to the desired temperature for properly drying the yarn. The yarn is then passed to a tempering compartment, wherein it is kept sufficiently moist and warm to prevent the undue drying or hardening of the outer fibers, after which the yarn is passed to a conditioning compartment wherein it is supplied with the proper amount of moisture for conditioning and softening the same. These compartments are substantially closed so that the yarn as it passes through the apparatus is kept free from cooling blasts of air.

The air passing from the drying compartment is led through a condenser wherein the greater portion of the moisture in the air is removed, and the air still retaining some moisture is utilized for forming a conditioning atmosphere for the yarn. Furthermore, the air in the conditioning compartment is caused to pass through into the tempering compartment, and thence to the drying compartment, and this aids in supplying proper warm and moist air to the tempering compartment.

In Fig. X, of the drawings, we have shown a slightly modified form of the apparatus, wherein a pipe 47, is connected with the pipe 27, and this pipe 47, leads to the suction side of one of the fans, in the tempering compartment. By this connection of the tempering compartment with the pipe 27, we are able to supply additional moisture to the tempering compartment, under the control of a damper 48.

In the handling of certain grades of linen twines, it is found that if they are handled and dried under the same conditions as other yarns, the tensile strength thereof is decreased. The outside layers dry much more rapidly than the inside layers, and there is evidently considerably more tension on the outside threads than on the wet ones which are inside. By our modified form of apparatus, the air in the tempering compartment may be so regulated that the outside fibers of the material being dried may not become bone dry, and pull away from the fibers at the interior of the threads. In other words, by our modified form of drying apparatus, the yarn may be dried in an atmosphere which can be so regulated as to maintain practically any desired condition of humidity.

It is sometimes desirable to supply the conditioning compartment with additional moisture, and we have, therefore, provided in our modified form of apparatus, an atomizer 49, which may be of any suitable construction, and by means of which water may be supplied to the air passing into the conditioning compartment. This atomizer is of particular value when the machine has been shut down for some time, as it may be used to properly regulate the conditions until the yarn is again being delivered under normal conditions. In this case, the heating coil in the conditioning compartment may be used for heating the air which is being circulated, in order to increase its capacity to absorb additional quantities of moisture.

It has been found to be an advantage in treating some classes of materials to provide an atmosphere that contains certain volatile substances, such as alcohol, benzine, turpentine, etc., as such atmospheres are more favorable for softening the texture and keeping open the pores or cells of the material being treated. These volatile substances may be introduced into the apparatus through the atomizer 49, above described. Our process and apparatus is especially adapted for the use of such volatile substances, as it is substantially a closed system. The volatile substances may be recovered and reused. The created atmosphere circulates and recirculates and the volatile substances not removed by condensation in the condenser 21, may be further used in drying, tempering and conditioning the material. Then again in the practice heretofore it has been customary to exhaust or waste large volumes of the hot, moist atmosphere from the drying compartment, while by our process and apparatus a certain portion of such atmosphere is returned and recirculated which permits of a higher steam economy.

Our apparatus is capable of a relatively wide range of adjustment, so that the yarns being dried may be subjected to the proper conditions, both as to moisture and heat, and that the resulting drying of the yarn is similar to the natural drying under most favorable conditions.

Our improved process consists, therefore, in the subjecting of the yarn or material to be dried, to heated air at a relatively high temperature, after which the material is immediately subjected to air which is warm, and a relatively low temperature, whereby the material being dried is tempered and maintained in proper condition, so that when it is subsequently passed to the conditioning atmosphere, it will be readily susceptible to moisture.

The process further consists in the utilizing of the air passing from the drying compartment, after it has passed through a condenser for removing a greater portion of the moisture, for forming a proper moist atmosphere for the conditioning of the yarn.

While we have referred to and described our device as especially adapted for drying yarn, it will be understood we have used this term in the broad sense, and that our apparatus and process are equally adapted for other purposes.

Having thus described our invention, we claim:

1. The process of drying and conditioning yarn, which consists in subjecting the yarn while loosely supported to a drying atmosphere and subsequently to a moist conditioning atmosphere without exposing the dried yarn to cooling air currents.

2. The process of drying and conditioning yarn, which consists in subjecting the yarn while loosely supported to heated air at a relatively high temperature, then subjecting the yarn to warm air at a relatively low temperature without exposing the dried yarn to cooling air currents, and then subjecting the yarn to a moist air for conditioning the same and also without exposing the yarn to cooling air currents.

3. The process of drying and conditioning material, which consists in subjecting the material while loosely suspended to a drying atmosphere and subsequently to a moist conditioning atmosphere without exposing the dried material to cooling air currents.

4. The process of drying and conditioning material which consists in subjecting the material while loosely suspended to heated air at a relatively high temperature, then subjecting the material to warm air at a relatively low temperature without exposing the dried material to cooling air currents, and then subjecting the material to a moist air for conditioning the same and also without exposing the material to cooling air currents.

5. A drying and conditioning apparatus comprising an inclosure, means for loosely suspending the material and passing the same through said inclosure, partitions for separating said inclosure into a drying compartment and a conditioning compartment, whereby the material to be dried and conditioned may be passed directly from the drying compartment to the conditioning compartment and whereby said material is subjected to a drying and conditioning air while loosely suspended in said compartment.

6. A drying and conditioning apparatus comprising an inclosure, means for passing the material through said inclosure, partitions for separating said inclosure into a drying compartment and a conditioning compartment, whereby the material to be dried and conditioned may be passed directly from the drying compartment to the conditioning compartment, means for circulating the air in each compartment, and means for passing the air from the drying compartment through a condenser and thence to the conditioning compartment.

7. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for circulating the air in each compartment, means for shunting a portion of the air in the conditioning compartment into the tempering compartment, and means for shunting a portion of the air in the tempering compartment into the drying compartment, and means for passing the air from the drying compartment into the conditioning compartment.

8. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for circulating the air in each compartment, means for shunting a portion of the air in the conditioning compartment into the tempering compartment, and means for shunting a portion of the air in the tempering compartment into the drying compartment, and means for passing the air from the drying compartment through a condenser and thence to the conditioning compartment.

9. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for circulating the air in each compartment, means for shunting a portion of the air in the conditioning compartment into the tempering compartment and means for shunting a portion of the air in the tempering compartment into the drying compartment, means for passing the air from the drying compartment through a condenser and thence to the conditioning compartment, and means for controlling the admission of extraneous air to the apparatus.

10. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for causing a circulation of air in each of said compartments, means whereby a portion of the air circulating in the conditioning compartment may be shunted into the tempering compartment, and whereby a portion of the air circulating in the tempering compartment may be shunted into the drying compartment, means for admitting extraneous air into the apparatus and thermostatic means for controlling the amount of extraneous air admitted to the apparatus, means for heating the air as it passes to the drying compartment, and means for removing a portion of the moisture from the air as it passes from the drying compartment to the conditioning compartment.

11. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for circulating the air in each compartment, and means for passing the air from the drying compartment through a condenser and thence to the conditioning compartment.

12. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for circulating the air in each compartment, means for passing the air from the drying compartment through a condenser and thence to the conditioning compartment, and thermostatic means for automatically controlling the admission of extraneous air to the apparatus.

13. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for circulating the air in each compartment, means for passing the air from the drying compartment through a condenser and thence to the conditioning compartment, and means whereby the air in the conditioning compartment may be heated.

14. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for circulating the air in each compartment, means for passing the air from the drying compartment through a condenser and thence to the conditioning compartment, and an atomizer whereby the air passing to the conditioning compartment may be supplied with moisture.

15. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for dividing each compartment, whereby the air therein may be caused to circulate, means located in each compartment for causing the air to circulate, a by-pass connecting each of the compartments, whereby a portion of the air circulating in the conditioning compartment may be shunted to the tempering compartment, and whereby a portion of the air circulating in the tempering compartment may be shunted to the drying compartment.

16. A drying and conditioning apparatus comprising an inclosure, means for passing the material through said inclosure, partitions for separating said inclosure into a drying compartment, a tempering compartment and a conditioning compartment, whereby the material to be dried and conditioned may be passed directly from the drying compartment through the tempering compartment to the conditioning compartment, means for supplying heated air to the drying compartment, means for dividing each compartment, whereby the air therein may be caused to circulate, means located in each compartment for causing the air to circulate, a by-pass connecting each of the compartments, whereby a portion of the air circulating in the conditioning compartment may be shunted to the tempering compartment, and whereby a portion of the air circulating in the tempering compartment may be shunted to the drying compartment, and means whereby the air circulating in the drying compartment may be led through a condenser to the conditioning compartment.

17. A drying and conditioning apparatus comprising an inclosure, means for passing the material through said inclosure, partitions for separating said inclosure into a drying compartment, means for supplying heated air to the drying compartment, a tempering compartment and a conditioning compartment, whereby the material to be dried and conditioned may be passed directly from the drying compartment through the tempering compartment to the conditioning compartment, means for dividing each compartment, whereby the air therein may be caused to circulate, means located in each compartment for causing the air to circulate, a by-pass connecting each of the compartments, whereby a portion of the air circulating in the conditioning compartment may be shunted to the tempering compartment, and whereby a portion of the air circulating in the tempering compartment may be shunted to the drying compartment, means whereby the air circulating in the drying compartment may be led through a condenser to the conditioning compartment, and means whereby a portion of the air passing from the condenser may be led to the tempering compartment.

18. The process of drying and conditioning materials, which consists in subjecting the materials to a drying atmosphere and a conditioning atmosphere in a substantially closed apparatus which atmosphere is charged with a volatile substance, such as alcohol, benzin or turpentine.

19. The process of drying and conditioning materials, which consists in subjecting the materials to a heated air charged with alcohol, benzin, turpentine or the like, passing the air from the materials through a condenser for removing a portion of the moisture and utilizing the air from the condenser for conditioning the materials, said materials after being dried being subjected to the conditioning atmosphere without being exposed to cooling air currents.

20. A drying and conditioning apparatus comprising an inclosure, means for passing the material through said inclosure, partitions for separating said inclosure into a drying compartment and a conditioning compartment, whereby the material to be dried and conditioned may be passed directly from the drying compartment to the conditioning compartment, means for circulating the air in each compartment, and automatic means for controlling the temperature of the air in the conditioning compartment.

In testimony whereof, we have hereunto signed our names at Philadelphia, Pennsylvania, this twenty-fifth day of July, 1913.

WALTER W. SIBSON.
THOMAS ALLSOP.

Witnesses:
JAMES H. BELL,
E. L. FULLERTON.